(12) United States Patent
Meyer et al.

(10) Patent No.: US 11,031,897 B1
(45) Date of Patent: Jun. 8, 2021

(54) METHOD AND APPARATUS FOR MITIGATION OF DC BUS PUMP-UP

(71) Applicant: Rockwell Automation Technologies, Inc., Mayfield Heights, OH (US)

(72) Inventors: Peter K. Meyer, Milwaukee, WI (US); Gennadi Sizov, Milwaukee, WI (US); Zoran Vrankovic, Milwaukee, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/751,799

(22) Filed: Jan. 24, 2020

(51) Int. Cl.
| | |
|---|---|
| *H02P 1/00* | (2006.01) |
| *H02P 1/28* | (2006.01) |
| *H02P 3/00* | (2006.01) |
| *H02P 7/06* | (2006.01) |
| *H02P 27/08* | (2006.01) |
| *H02M 7/06* | (2006.01) |
| *H02M 7/5387* | (2007.01) |
| *H02M 1/14* | (2006.01) |
| *H02M 1/12* | (2006.01) |
| *H02M 5/458* | (2006.01) |

(52) U.S. Cl.
CPC .............. *H02P 27/08* (2013.01); *H02M 1/12* (2013.01); *H02M 1/14* (2013.01); *H02M 5/4585* (2013.01); *H02M 7/06* (2013.01); *H02M 7/53871* (2013.01); *H02M 2001/123* (2013.01)

(58) Field of Classification Search
CPC .................................. H02P 27/08; H02M 1/12
USPC .......................................................... 318/504
See application file for complete search history.

(56) References Cited

U.S. PATENT DOCUMENTS

| | | | |
|---|---|---|---|
| 7,075,267 B1 * | 7/2006 | Cheng ............... | H02M 7/53875 318/432 |
| 7,649,756 B2 | 1/2010 | Kerkman et al. | |
| 8,503,207 B2 | 8/2013 | Tallam et al. | |
| 8,917,066 B2 | 12/2014 | Nagel et al. | |
| 2004/0062062 A1 * | 4/2004 | Lee .................. | H02P 21/36 363/37 |
| 2010/0165674 A1 * | 7/2010 | Dai ................... | H02M 7/53873 363/37 |

OTHER PUBLICATIONS

Ahmet M. Hava; Carrier Based PWM-VSI Drives in the Overmodulation Region; University of Wisconsin—Madison 1998—(371) pages.

(Continued)

*Primary Examiner* — Erick D Glass
(74) *Attorney, Agent, or Firm* — Boyle Fredrickson, SC

(57) ABSTRACT

A modulation routine in a motor drive under lightly loaded conditions which prevents DC bus voltage pump-up includes both active states and zero states. In a first zero state, each phase of the motor is connected to a negative rail of the DC bus, and in a second zero state, each phase of the motor is connected to a positive rail of the DC bus. When motor is lightly loaded or unloaded such that DC bus voltage pump-up may occur, the two zero states are utilized in an uneven manner. The specific division of the zero state between the first and second zero states may be selected in a manner that prevents the DC bus voltage pump-up from occurring.

19 Claims, 8 Drawing Sheets

(56) References Cited

OTHER PUBLICATIONS

Hyeoun-Gon Lee et al.,; Common-Mode Voltage Reduction Method Modifying the Distribution of Zero-Voltage Vector in PWM Converter/Inverter System; IEEE Transactions on Industry Applications, vol. 37, No. 6, Nov./Dec. 2001; pp. 1732-1738—(7) pages.

Vladimir Blasko; Analysis of a Hybrid PWM Based on Modified Space-Vector and Triangle-Comparison Methods; IEEE Tranactions on Industry Applications, vol. 33, No. 3, May/Jun. 1997; pp. 756-764—(9) pages.

Suwankawin et al.,; Destruction by Charge Current and Its Solution for PWM Inverter Feeding Multiple Motors Through Long Cables; IAS 2005; A.P.Y. Engineering Co, Ltd., Bangkok, Thailand; pp. 1382-1389—(8) pages.

Ahmet M. Hava; Performance Analysis of Reduced Common-Mode Voltage PWM Methods and Comparison With Standard PWM Methods for Three-Phase Voltage-Source Inverters; IEEE Transactions on Power Electronics, vol. 24, No. 1, Jan. 2009; pp. 241-252—(12) pages.

Ahmet M. Hava et al.,; Simple Analytical Tools for Carrier Based PWM Methods; 1997 IEEE; University of Wisconsin-Madison; Rockwell Automation-Allen Bradley; pp. 1462-1471—(10) pages.

Tallam et al.,; Common-Mode Voltage Reduction PWM Algorithm for AC Drives; 2009 IEEE; Rockwell Automation/Allen-Bradley; pp. 3360-3367—(8) pages.

Skibinski; Boost Converter Phenomenon of DC Bus Voltage With Lightly Loaded IGBT Drives Using a High Carrier Frequency; AB Standard Drives Application note; Rockwell Automation/Allen-Bradley—(3) pages.

Tallam et al.,; Integrated Differential-Mode and Common-Mode Filter to Mitigate the Effects of Long Motor Leads on AC Drives; IEEE Transactions on Industry Applications, vol. 47, No. 5, Sep./Oct. 2011; pp. 2075-2083—(9) pages.

Yin et al.,; Analytical Investigation of the Switching Frequency Harmonic Characteristic for Common Mode Reduction Modulator; IAS 2005; Rockwell Automation—(8) pages.

\* cited by examiner

METHOD AND APPARATUS FOR MITIGATION OF DC BUS PUMP-UP

BACKGROUND INFORMATION

The subject matter disclosed herein relates to modulation techniques in a power converter and, more specifically, to partitioning zero-state modulation in a motor drive to mitigate an undesired boosting of a DC bus voltage within the motor drive under light load conditions.

As is known to those skilled in the art, motor drives are utilized to control operation of a motor. According to one common configuration, a motor drive includes a DC bus having a DC voltage of suitable magnitude from which an AC voltage may be generated and provided to an AC motor. The DC voltage may be provided as an input to the motor drive or, alternately, the motor drive may include a converter section which converts an AC voltage input to the DC voltage present on the DC bus. The converter section may be passive, including conventional diode rectification, or active, including controlled power electronic switching devices, either of which may convert an AC voltage input to a DC voltage for the DC bus. The power electronic switching devices in an active rectifier may be selected from transistors, such as insulated gate bipolar transistors (IGBTs) or metal oxide semiconductor field-effect transistors (MOSFETs), thyristors, or silicon-controlled rectifiers (SCRs). The power electronic switching device may also include a reverse conduction power electronic device, such as a freewheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus.

The motor drive receives a command signal which indicates the desired operation of the motor. The command signal may be a desired torque, speed, or position at which the motor is to operate. The torque, speed, or position of the motor are controlled by varying the amplitude and frequency of the AC voltage applied to the stator. An inverter section is provided between the DC bus and the output of the motor drive to generate the controlled AC voltage. The inverter section includes power electronic switching devices, such as IGBTs, MOSFETs, thyristors, or SCRs, and a reverse conduction power electronic device connected in parallel across the power electronic switching device. The motor is connected to the output terminals of the motor drive, and the controller generates the switching signals to rapidly switch the switching devices in the inverter on and off at a predetermined switching frequency and, thereby, to alternately connect or disconnect the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

However, using modulation techniques to generate variable frequency and variable amplitude output voltages is not without certain drawbacks. Modulation occurs at frequencies much greater than the desired fundamental frequency output from the motor drive. As each switching device is alternately enabled and disabled, the transition between voltage levels generates alternating currents at the switching frequency and at multiples, or harmonics, of the switching frequency. These alternating currents may be in the kilohertz or megahertz ranges. As is understood in the art, alternating currents are more readily conducted by capacitive reactance. Capacitors may be intentionally included in a motor drive or at the terminals, either at the input or at the output, to filter these high frequency currents to ground. Additionally, parasitic capacitances exist, for example, between motor leads and ground. The high frequency currents, also referred to as common-mode currents, may similarly be conducted via these parasitic capacitances.

High frequency currents conducted either intentionally via a filter capacitor or unintentionally via the parasitic capacitance may end up circulating within the motor drive and, in particular, through the DC bus capacitors. When the high frequency currents circulate through the DC bus capacitors and the motor drive is controlling modulation of the inverter section in the motor drive, these circulating currents and the modulation can function in a manner similar to a boost converter, causing the voltage on the DC bus to increase. If the motor has a load or includes other loss elements, the additional power added to the DC bus as a result of this boost from the circulating currents is delivered to the motor or is dissipated by the loss element. If, however, the motor is unloaded or has no other path by which the energy may be dissipated, the voltage on the DC bus may continue to increase as a result of the circulating currents and modulation until the motor drive reaches an overvoltage condition.

Thus, it would be desirable to provide a method for controlling modulation in a motor drive under lightly loaded conditions which prevents such an undesirable increase in the voltage present on the DC bus.

BRIEF DESCRIPTION

According to one embodiment of the invention, a method for generating switching commands in a motor drive includes determining a modulation index for a modulation routine in the motor drive, determining a first percentage of time within a switching period as a function of the modulation index, and determining a second percentage of time within the switching period as a function of the modulation index. The first percentage of time corresponds to an active state for the modulation routine, and the second percentage of time corresponds to a zero state for the modulation routine in the motor drive. The zero state includes a first zero state and a second zero state, and the modulation routine divides the zero state between the first zero state and the second zero state. When the modulation index is less than one-half: the first zero state is used for a first portion of the zero state, the second zero state is used for a second portion of the zero state, the first portion of the zero state is not equal to the second portion of the zero state, and both the first portion and the second portion of the zero state are non-zero.

According to another embodiment of the invention, a motor drive includes a DC bus, a DC bus capacitance, an inverter, and a processor. The DC bus has a positive rail and a negative rail and is operative to have a DC bus voltage present between the positive and negative rails. The DC bus capacitance is connected between the positive and negative rails. The inverter section includes an input operatively connected to the DC bus, an output operative to supply an output voltage to a motor connected to the motor drive, and multiple switching devices operatively connected between the input and the output to selectively connect either the positive or negative rail of the DC bus to the output, where each of the switching devices is controlled by a switching signal. The processor is operative to determine a modulation index for a modulation routine, determine a first percentage of time within a switching period as a function of the modulation index, and determine a second percentage of time within the switching period as a function of the modulation index. The first percentage of time corresponds to an active state for the modulation routine, and the second percentage of time corresponds to a zero state for the modulation routine. The zero state includes a first zero state and a second zero state, and the modulation routine is operative to divide the zero state between the first zero state and the second zero state. When the modulation index is less than an upper setpoint: the first zero state is used for a first portion of the zero state, the second zero state is used for a second portion of the zero state, the first portion of the zero state is not equal to the second portion of the zero state, and both the first portion and the second portion of the zero state are non-zero.

According to still another embodiment of the invention, a method for generating switching commands in a motor drive determines a modulation index for a modulation routine in the motor drive, a first percentage of time within a switching period as a function of the modulation index, and a second percentage of time within the switching period as a function of the modulation index. The first percentage of time corresponds to an active state for the modulation routine, and the second percentage of time corresponds to a zero state for the modulation routine in the motor drive. The zero state includes a first zero state and a second zero state, and the modulation routine divides the zero state between the first zero state and the second zero state. When the modulation index is less an upper setpoint: the first zero state is used for a first portion of the zero state, the second zero state is used for a second portion of the zero state, the first portion of the zero state is not equal to the second portion of the zero state, and both the first portion and the second portion of the zero state are non-zero. When the modulation index is greater than the upper setpoint: the first zero state is used for the first portion of the zero state, the second zero state is used for the second portion of the zero state, and the first portion of the zero state is equal to the second portion of the zero state.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
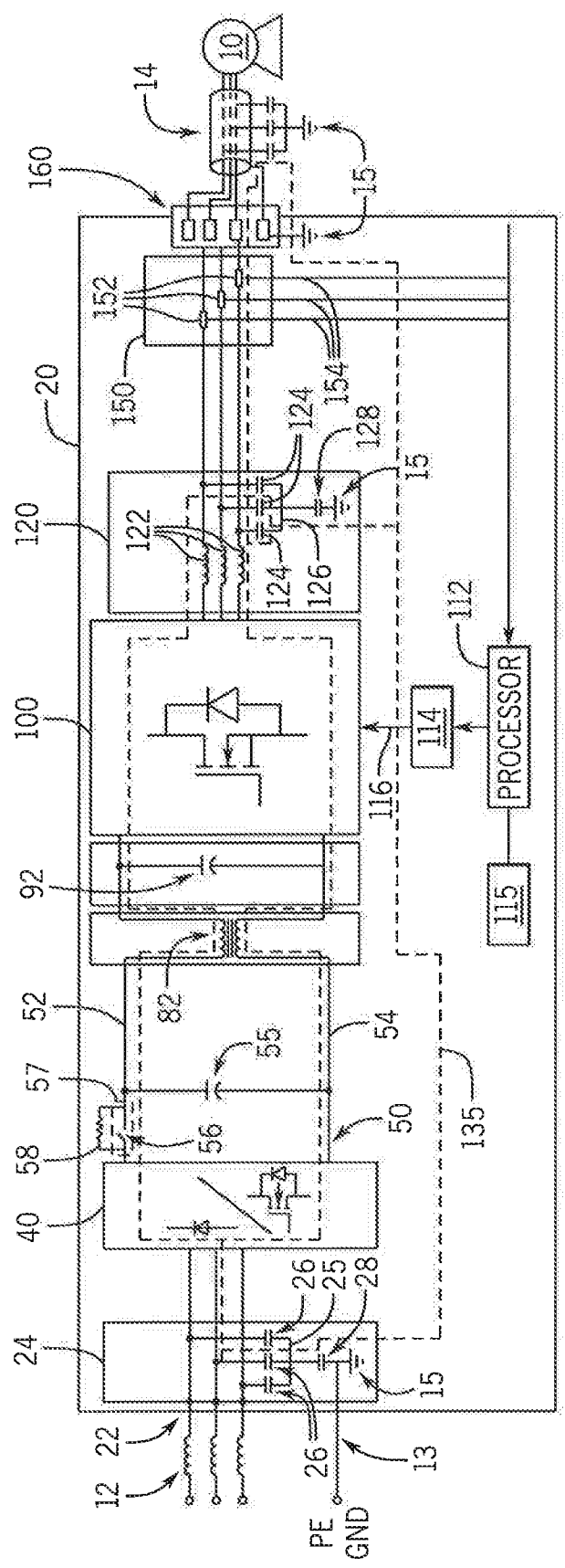
FIG. 1 is a schematic representation of an exemplary motor drive connected to a motor, wherein the motor drive incorporates one embodiment of the DC bus pump-up mitigation.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a method for controlling modulation in a motor drive under lightly loaded conditions which prevents DC bus voltage pump-up. The motor drive executes a modulation routine that includes both active states and zero states. In an active state, at least one phase of the motor is connected to a different polarity of the DC bus than another phase. In a zero state, each phase of the motor is connected to the same polarity on the DC bus. In a first zero state, the motor drive connects each phase of the motor to a negative rail of the DC bus, and in a second zero state, the motor drive connects each phase of the motor to a positive rail of the DC bus. When a load is applied to the motor, the motor drive utilizes both active and zero states. The active states are defined according to a desired voltage to be output to the motor and utilize a portion of each switching period. The zero states fill in the remainder of the duration of each switching period.

As the motor drive is supplying voltage to control operation of a motor connected to the drive, the motor drive monitors the modulation index required to achieve a desired output voltage, where the modulation index increases as the load driven by the motor increases. The motor drive utilizes the monitored modulation index to select one of at least two different modulation routines by which the output voltage is regulated. In a first modulation routine, the modulation index indicates the motor is lightly loaded or unloaded such that the DC bus voltage pump-up may occur. Within this first modulation routine, the first and second zero states are utilized in an uneven manner within the portion of the switching period allocated to the zero state. The specific division of the zero state between the first and second zero states may be selected in a manner that prevents the DC bus voltage pump-up from occurring. In a second modulation routine, the modulation index indicates a sufficient load is applied to the motor to prevent the DC bus voltage pump-up from occurring. Because the load applied to the motor is sufficient to prevent the DC bus voltage pump-up, utilization of the first and second zero states may be divided evenly which provides additional benefits in the motor drive under loaded conditions.

Turning initially to FIG. 1, one embodiment of a motor drive 20 incorporating DC Bus pump-up mitigation is illustrated. An AC voltage 12 is provided at an input 22 to the motor drive 20. According to the illustrated embodiment, the AC voltage 12 is a three-phase AC input voltage. An AC input voltage source earth ground wire 13 connects to the motor drive 20 at an enclosure chassis frame ground 15. The enclosure chassis frame ground 15 is similarly connected at the output to provide a common connection for the output cable 14 to the motor 10. The enclosure chassis frame ground 15 will also be referred to herein as the common connection 15. The motor drive supplies an AC output voltage from an output 160 of the motor drive to a motor 10 operatively connected to the motor drive 20 via a cable 14. The output voltage is a three-phase AC output voltage with individual conductors shown extending between the motor 10 and drive 20 for each phase as well as for aground conductor. It is understood that the illustrated conductors may be combined within a cable 14, run as individual conductors, or a combination thereof according to the application requirements. As further illustrated in FIG. 1, a parasitic capacitance 140 may be present within the cable 14 and is a result of the conductors running in parallel with a shield conductor on the cable 14 and is not indicative of an actual capacitor being connected between each conductor and a ground connection. The amount of parasitic capacitance 140 increases with the length of the cable 14 and may become significant when a long cable is required between the motor drive 20 and the motor 10.

After the input 22 of the motor drive 20, a first filter 24 is connected in series between the input 22 and a converter section 40 of the motor drive. The first filter 24 includes a capacitor 26 connected between each phase of the AC input voltage and a common connection point 25 for the first filter. For the three-phase AC input voltage 12 illustrated, the first filter 24 includes three capacitors 26 each connected between one phase of the input voltage and the common connection point 25. Optionally, a fourth capacitor 28 may also be provided. The fourth capacitor 28 is connected between the common connection point 25 of the first filter 24 and a common connection 15 for the motor drive 20. The common connection 15 shown in FIG. 1 is a ground connection.

Figure 2:
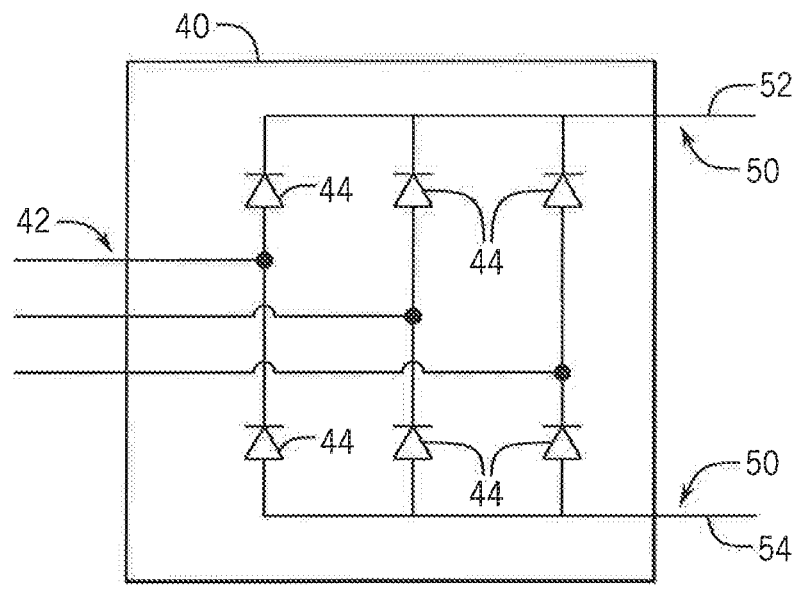
FIG. 2 is a schematic representation of one embodiment of a converter section from the motor drive of FIG. 1.

The converter section 40 may include any electronic device suitable for passive or active rectification as is understood in the art. With reference also to FIG. 2, the illustrated converter section 40 is a passive converter and includes a set of diodes 44 forming a diode bridge. The converter section 40 receives the AC voltage at an input 42, rectifies the three-phase AC voltage to a DC voltage, and provides the DC voltage to a DC bus 50 at an output of the converter section. Optionally, the converter section may be an active converter, which includes gate controlled switching devices including, but not limited to, thyristors, silicon-controlled rectifiers (SCRs), or silicon based transistors, such as IGBTs or MOSFETs. The converter section may alternately include high frequency switching devices including, but not limited to, Silicon Carbide (SiC) or Gallium Nitride (GaN) wide band gap IGBTs or MOSFETs which may switch in the twenty kilohertz (20 kHz) to the megahertz range to convert the voltage at the input 42 from AC to a DC voltage for the DC bus 50. The DC bus 50 is connected to the output of the converter section 40, and the DC voltage output by the converter is present between the positive rail 52 and the negative rail 54 of the DC bus 50.

Referring again to FIG. 1, a DC bus capacitor 55 is connected between the positive and negative rails, 52 and 54, to reduce the magnitude of the ripple voltage resulting from converting the AC voltage to a DC voltage. It is understood that the DC bus capacitor 55 may be a single capacitor or multiple capacitors connected in parallel, in series, or a combination thereof. The magnitude of the DC voltage between the negative and positive rails, 54 and 52, is generally equal to the magnitude of the peak of the AC input voltage.

As also shown in FIG. 1, a DC bus charge circuit 57 may be connected on the DC bus 50. In the illustrated embodiment, the DC bus charge circuit 57 is connected between the output of the converter section 40 and the DC bus capacitor 55. Initially, a switch 56 is in a normally open state, establishing a conduction path from the output of the converter section 40 to the positive rail 52 via a charge resistor 58. The charge resistor 58, in combination with the DC bus capacitor 55 establishes a charging time constant, as is understood in the art, to allow the DC voltage on the DC bus 50 to charge from zero volts DC at power up to a voltage level approximately equal to the full DC bus voltage resulting from rectifying the AC input voltage. When the DC voltage level reaches a preset charged level, the switch 56 is closed, bypassing the charge resistor 58 and allowing current to flow directly from the converter section 40 onto the DC bus 50.

The DC bus 50 is connected in series between the converter section 40 and an inverter section 100. One or more additional filters may be included between the converter section 40 and the inverter section 100 according to the application requirements. According to the illustrated embodiment, a DC common-mode inductor 82, also referred to as a DC common-mode choke, is connected in series with the DC bus 50. Conductors for both the positive rail 52 and the negative rail 54 are wrapped around a common core and connected in series with each rail. According to the embodiment illustrated in FIG. 1, the DC common-mode inductor 82 is positioned between the first DC bus capacitor 55 and a second DC bus capacitor 92. The second DC bus capacitor 92 may be a high frequency inverter differential-mode snubber capacitance 92 connected between the positive rail 52 and the negative rail 54 of the DC bus 50. It is understood that the high frequency capacitance 92 may be a single capacitor or multiple capacitors connected in parallel, in series, or a combination thereof. The high frequency capacitance 92 is connected at the input of the inverter section 100 and is used to reduce the magnitude of the inverter ripple voltage present on the DC bus 50 as a result of the high frequency switching in the inverter section to convert the DC voltage back to an AC voltage. In some embodiments, it is contemplated that a single DC bus capacitance may be provided and may be located on either side of the DC common-mode inductor 82. The output of the second DC bus capacitor 92 is a filtered DC bus connected as an input to the inverter section. The filtered DC bus is illustrated as a positive filtered DC bus rail 102 and a negative filtered DC bus rail 104.

Figure 3:
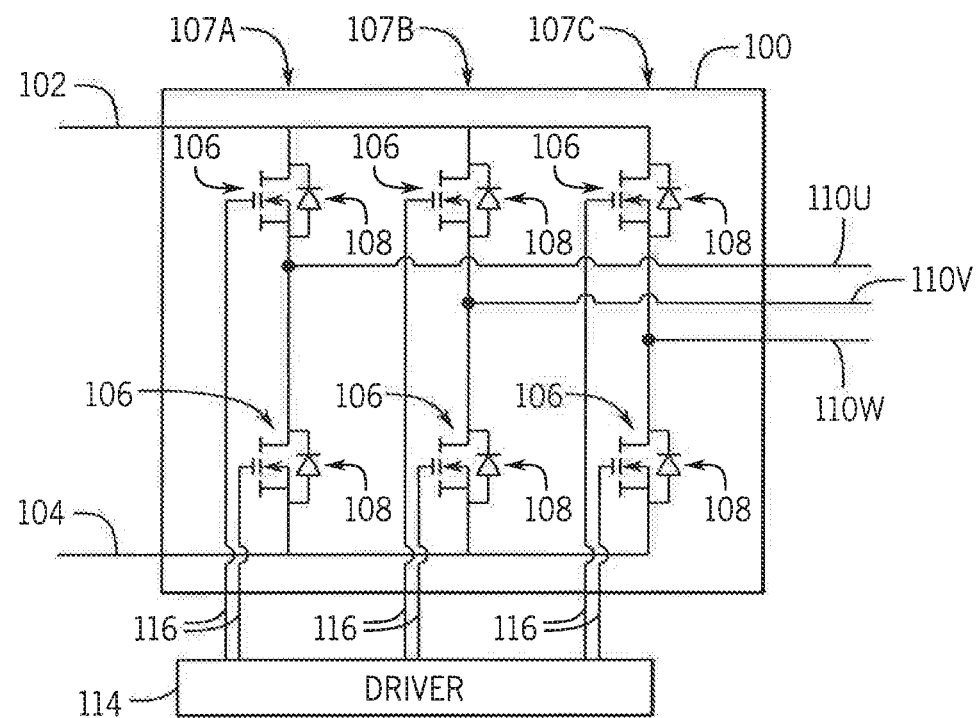
FIG. 3 is a schematic representation of one embodiment of an inverter section from the motor drive of FIG. 1.

The inverter section 100 consists of gate controlled switching elements as described for the active converter 40, such as silicon and/or wide band based materials for IGBTs or MOSFETs, or Silicon Gate Controlled Thyristors (SCGT) and Gate Turn-Off thyristors (GTO) for medium voltage, high power units gap transistors as is known in the art. With reference also to FIG. 3, the illustrated inverter section 100 includes a power metal-oxide-semiconductor field-effect transistor (MOSFET) 106 and a reverse connected device 108, which may be a free-wheeling diode or a MOSFET's inherent body diode, connected in pairs between the filtered positive rail 102 and each phase of the output voltage (110 U, 110V, 110 W) as well as between the filtered negative rail 104 and each phase of the output voltage. Each of the transistors 106 receives switching signals 116 to selectively enable the transistors 106 and to convert the DC voltage from the DC bus into a controlled three phase output voltage to the motor 10. When enabled, each transistor 106 connects the respective rail 102, 104 of the DC bus to one output phase 110, which is, in turn, connected between the inverter section 100 and the output terminal 160.

Between the inverter section 100 and the output terminal 160 is illustrated an additional filter section 120 connected to each phase of the AC output voltage. The additional filter section 120 includes an inductor 122 and a capacitor 124 for each phase of the AC output voltage. Each inductor 122 is connected in series with one phase of the output voltage (110 U, 110V, 110 W) at the output of the inverter section 100. Capacitors 124 are then connected after the inductors 122 and between each phase of the AC output voltage and a common connection point 126 in a wye configuration. For the three-phase AC output voltage illustrated, the additional filter section 120 includes three capacitors 124 each connected between one phase of the output voltage and the common connection point 126. The inductors 122 and capacitors 124 form a differential mode, second order L-C filter for each phase of the AC output voltage which attenuates undesirable inverter switching frequency voltage harmonics being passed to the current sense module 150 and motor 10. The L-C filter converts a discontinuous PWM output voltage present on each phase of the AC output voltage into a near sinusoidal line-to-line voltage, which reduces heating in the motor 10, audible noise, and electromagnetic interference (EMI) from the output cable 14. A fourth capacitor 128 may also be provided. The fourth capacitor 128 is connected between the common connection point 126 and the common connection 15 for the motor drive 20. The capacitor 128, if included, serves as a common-mode output filter to the chassis ground 15. AC common-mode voltage generated by the PWM switching sequence in the inverter 100 is applied to the output filter block 120. Within the output filter block 120, this AC common-mode voltage is applied across the inductors 122, capacitors 124, and finally the common-mode capacitor 128 to ground at the common connection 15. As a result, a common-mode conduction path is established within the motor drive 20, resulting in a common-mode current 135 circulating within the motor drive 20, reducing output EMI interference in the output cable 14 and motor 10 and reducing the common-mode current circulating via the parasitic capacitance 140 present between the cable 14 and/or motor 10 to the common connection 15.

A current sense module 150 is provided after the output filtering. The current sense module 150 includes a current sensor 152 on each phase of the AC output voltage. Each current sensor 152 generates a current feedback signal 154 corresponding to the current present at the output 160 of the motor drive for each phase of the AC output.

In operation, the motor drive 20 is configured to control operation of the motor 10 connected at the output 160. According to the embodiment illustrated in FIG. 1, a processor 112 and a driver circuit 114 may include and manage execution of modules used to control operation of the motor drive 20. The illustrated embodiment is not intended to be limiting and it is understood that various features of each module may be executed by another module and/or various combinations of other modules may be included in the processor 112 without deviating from the scope of the invention. The modules may be stored programs executed on one or more processors, logic circuits, or a combination thereof. The processor 112 may be implemented, for example, in a microprocessor, application specific integrated circuit (ASIC), field programmable gate array (FPGA), or other such customizable device. The motor drive 20 also includes a memory device 115 in communication with the processor 112. The memory device 115 may include transitory memory, non-transitory memory or a combination thereof. The memory device 115 may be configured to store data and programs, which include a series of instructions executable by the processor 112. It is contemplated that the memory device 115 may be a single device, multiple devices, or incorporated, for example, as a portion of another device such as an application specific integrated circuit (ASIC). The processor 112 is in communication with the memory 115 to read the instructions and data as required to control operation of the motor drive 20.

According to one embodiment of the invention, the processor 112 receives a reference signal identifying desired operation of the motor 10 connected to the motor drive 20. The reference signal may be, for example, a torque reference (T*), a speed reference (ω*), or a position reference (θ*). The processor 112 also receives feedback signals indicating the current operation of the motor drive 20. The motor drive 20 may include a voltage sensor and/or a current sensor operatively connected to the DC bus 50 and generating a feedback signal corresponding to the magnitude of voltage and/or current present on the DC bus. The motor drive 20 may also include one or more current sensors 152 and one or more voltage sensors on each phase of the AC output voltage generating feedback signals 154 corresponding to the magnitude of output current and/or voltage present at the output 160 of the motor drive 20.

The processor 112 utilizes the feedback signals and the reference signal to control operation of the inverter section 100 to generate an output voltage having a desired magnitude and frequency for the motor 10. The processor 112 may generate a desired output voltage signal to a driver module 114. The driver module 114, in turn, generates the switching signals 116, for example, by pulse width modulation (PWM) or by other modulation techniques. The switching signals 116 subsequently enable/disable the transistors 106 to provide the desired output voltage to the motor 10, which, in turn, results in the desired operation of the motor 10.

According to one embodiment of the invention, the modulation technique utilized is a space-vector pulse width modulation (SVPWM) technique. For purposes of illustration, the present invention will be discussed with respect to SVPWM. It is understood that various other methods of modulation and/or hybridization of multiple modulation techniques may be utilized. The present invention may be implemented in any modulation technique incorporating both a zero state and an active state. A zero state is an operating state for the motor drive 20 in which all three switching devices 106 along either the top row or the bottom row (see FIG. 3) of the inverter 100 are enabled in tandem. An active state is an operating state for the motor drive 20 in which at least one switching device 106 from both the top row and the bottom row are enabled in tandem.

Figure 6:
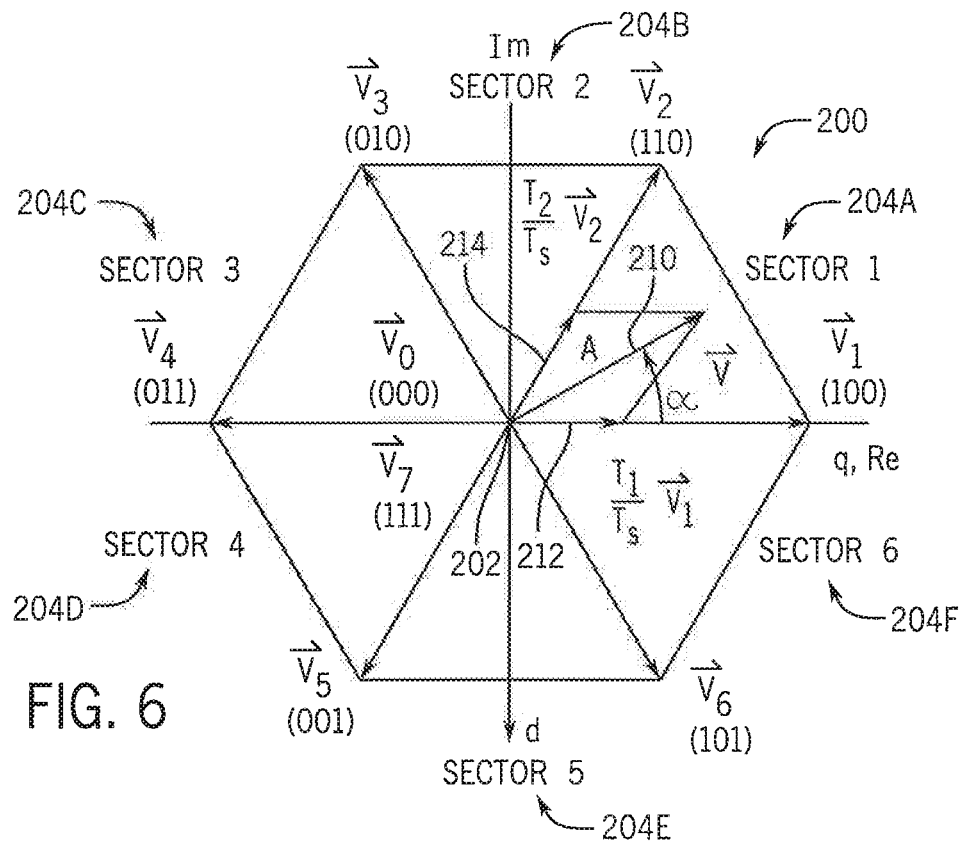
FIG. 6 is a graphic representation of voltage vectors used in one embodiment of a modulation routine used for DC bus pump-up mitigation.
Figure 7:
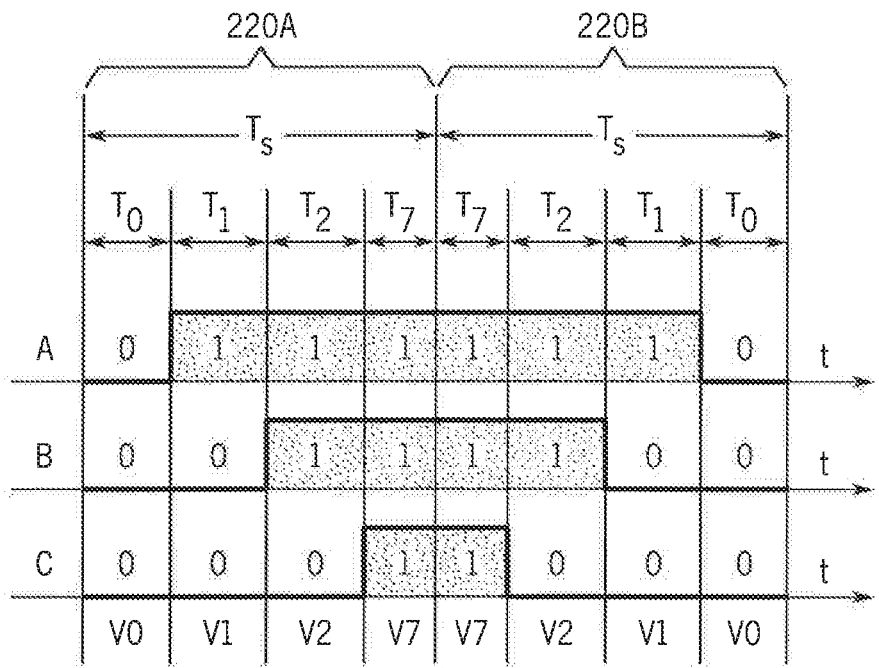
FIG. 7 is a tabular representation of switching signals used to control the inverter of FIG. 3 to generate the voltage vector via the modulation routine of FIG. 6.

Turning next to FIGS. 6 and 7, an exemplary application of SVPWM is described. The motor drive 20 determines a frequency and magnitude of output voltage to supply to the motor 10 to achieve desired operation of the motor. At each instance in time, the fundamental sinusoidal voltage output may be represented by a vector having an amplitude and an angle. For the illustrated three phase motor 10, the motor drive 20 determines a desired output voltage for each phase, where the magnitude of a vector representation for each phase would be identical and the phase of the vector representation for each phase is offset by one hundred twenty degrees (120°). Park's transformation is applied to the vectors defining the desired output voltage for each phase to transform three-phase vector representation of the output voltage to a two-phase vector representation of the output voltage in a d-q reference frame 200. With reference to FIG. 6, an exemplary vector 210 at one instance in time includes an amplitude, A, and an angle, a. The exemplary vector 210 changes angle, a, over time, causing the vector 210 to rotate about the origin 202 of the d-q reference frame.

As also illustrated in FIG. 6, the d-q reference frame 200 is divided into six (6) active sectors 204a-204f. At the boundary dividing each sector, a voltage vector, $V_1$-$V_6$, is illustrated. The illustrated voltage vectors $V_1$-$V_6$, correspond to an output voltage having rated amplitude at that angle. To generate the illustrated voltage vectors $V_1$-$V_6$, the switching devices 106 are enabled for one hundred percent (100%) of the duration of the switching interval, $T_s$, according to the switches identified for each leg 107 (indicated within parentheses by each voltage vector). A "1" within the parentheses indicates that the top switch 106 for the leg is active, and a "0" within the parentheses indicates that the bottom switch 106 for the leg is active. For example, along the q-axis, extending horizontally to the right, the first voltage vector, $V_1$, is generated by enabling the top switch 106 in the first leg 107A and the bottom switches in the second leg 107 B and third leg 107B. Rotating about the origin sixty degrees (60°) counterclockwise, the second voltage vector, $V_2$, is generated by enabling the top switches 106 in the first leg 107A and the second leg 107B and the bottom switch in the third leg 107B.

When determining the required output voltage to achieve desired operation of the motor, the motor drive 20 first determines a modulation index. The modulation index typically has a range between zero and one, where zero is equal to no modulation and one is equal to full modulation. The modulation index is proportional to a desired amplitude of the voltage output to the motor 10. The motor drive 20 also utilizes a position feedback signal or a position estimate corresponding to the angular position of the motor 10 to determine a desired angle of the output voltage. The modulation index and desired angle define a desired voltage vector to be output to the motor 10. The six voltage vectors, $V_1$-$V_6$, at boundaries between segments 204 are special cases illustrating six specific output states for the motor drive. At each boundary, the modulation index for each of the six voltage vectors, $V_1$-$V_6$, is one, meaning these are the output voltages that would be generated if the indicated switches 106 are constantly energized throughout the switching period. These six combinations of active states generate voltage vectors that are evenly spaced sixty degrees apart.

However, when the motor drive 20 is controlling operation of the motor, the desired output voltage is typically defined by a vector other than one of the six boundary voltage vectors, $V_1$-$V_6$. An exemplary vector 210 is shown between the first voltage vector, $V_1$, and the second voltage vector, $V_2$, where the exemplary vector 210 has an amplitude, A, and an angle, α. In order to supply a voltage at the output of the motor drive 20 that corresponds to the exemplary vector 210, the motor drive 20 operates for a first time, $T_1$, at the first voltage vector and for a second time, $T_2$, at the second voltage vector. The SVPWM routine executes at a switching frequency, which may vary between kilohertz and megahertz. The switching frequency is selected according to application requirements and may vary as a function of a number of factors, including but not limited to the power rating of the motor 10, the type of switching devices 106 selected, and the desired output frequency for the motor 10. A switching period, $T_s$, is defined, which is the inverse of the switching frequency. Within each switching period, $T_s$, the motor drive 20 will operate for a portion of the switching period, $T_s$, in each active state adjacent to the exemplary vector 210 and, if time remains within the switching period, $T_s$, in one or more zero states.

With reference again to FIG. 6, the exemplary vector 210 is projected onto each adjacent boundary voltage vector. A first projected vector 212 is overlaid along the first voltage vector, $V_1$, and a second projected vector 214 is overlaid along the second voltage vector, $V_2$. The duration of time required for each projected vector 212, 214 is proportional to the length of the projected vector compared to the length of the boundary voltage vector which would result from the motor drive operating at that location for the entire switching period. As illustrated, the duration of the first projected vector 212 is the first time, $T_1$, and the duration of the second projected vector 214 is the second time, $T_2$. When the motor drive 20 operates at the first and second boundary condition for the first and second times, respectively, the average voltage output by the motor drive 20 corresponds to the exemplary voltage vector 210. If there is extra time within a switching period after operating at the two boundary conditions for the combined first and second times, the motor drive 20 operates in a zero state for the remaining duration of each switching period, $T_s$.

In addition to the six voltage vectors, $V_1$-$V_6$, illustrated in FIG. 6, the SVPWM routine includes two zero state voltage vectors, which will be referred to as $V_0$ and $V_7$. The zero state is divided into a first zero state and a second zero state, where the first zero state voltage vector, $V_0$, will be generated in the first zero state and the second zero state voltage vector, $V_7$, will be generated in the second zero state. With respect to the d-q reference frame 200 shown in FIG. 6, each zero state vector is located at the origin 202. An output vector at the origin 202 of the d-q reference frame 200 does not output and differential mode voltage. As a result, they can be used to fill any time remaining in the switching period that is not needed for the active switching states. However, these two zero state vectors output a significant common-mode voltage in comparison to the active states of the inverter section 100. This large common-mode voltage is generated by connecting in tandem either all three of the top or all three of the bottom switches 106, as shown in FIG. 3. During the first zero state, the first zero state voltage vector, $V_0$, corresponds to each of the bottom three switches 106 being connected to the negative DC bus 104. In this first zero state, the inverter section 100 outputs a common-mode voltage equal to the negative DC bus voltage. During the second zero state, the second zero state voltage vector, $V_7$, corresponds to each of the top three switches 106 being connected to the positive DC bus 102. In this second zero state, the inverter section 100 outputs a common-mode voltage equal to the positive DC bus voltage. The common-mode voltage output by either zero state voltage vector can produce unwanted common-mode currents as a function of the switching frequency and of the common-mode impedance present in the motor drive 20.

Turning again to FIG. 7, the exemplary vector 210 of FIG. 6 requires switching along the first voltage vector, $V_1$, for the first time, $T_1$, and switching along the second voltage vector, $V_2$, for the second time, $T_2$. The total duration of the first and second times are less than the duration of the switching period, $T_s$. Therefore, the motor drive 20 will operate in the zero state for a duration equal to the difference between the switching period, $T_s$, and the sum of the first and second times. In the illustrated embodiment, the motor drive 20 outputs the active states during the middle of each switching period and uses the zero states to fill in the remaining duration of time at the start and end of each switching period. During a first switching period 220A the first zero state (represented by the first zero state voltage vector, $V_0$, and the first time, $T_0$) fills a first portion of the switching period, $T_s$, prior to the active states, and the second zero state (represented by the second zero state voltage vector, $V_7$, and the second time, $T_7$) fills a second portion of the switching period after the active states. As a result, the motor drive 20 is operating in four different states to output four different voltage vectors within one switching period such that the average output of the motor drive 20 within that switching period corresponds to the desired voltage vector 210. During a second switching period 220B, the order of the active states, $V_1$ and $V_2$, as well as the order of the zero states, $V_0$ and $V_7$ are reversed from the order in which they are executed during the first switching period 220B. The resultant average voltage output by the motor drive 20 during the second switching period 220B is, however, equal to the average voltage output by the motor drive 20 during the first switching period 220A. It is contemplated that alternating switching periods may execute active states and zero states either in the same order or alternating order without deviating from the scope of the invention.

Figure 4:
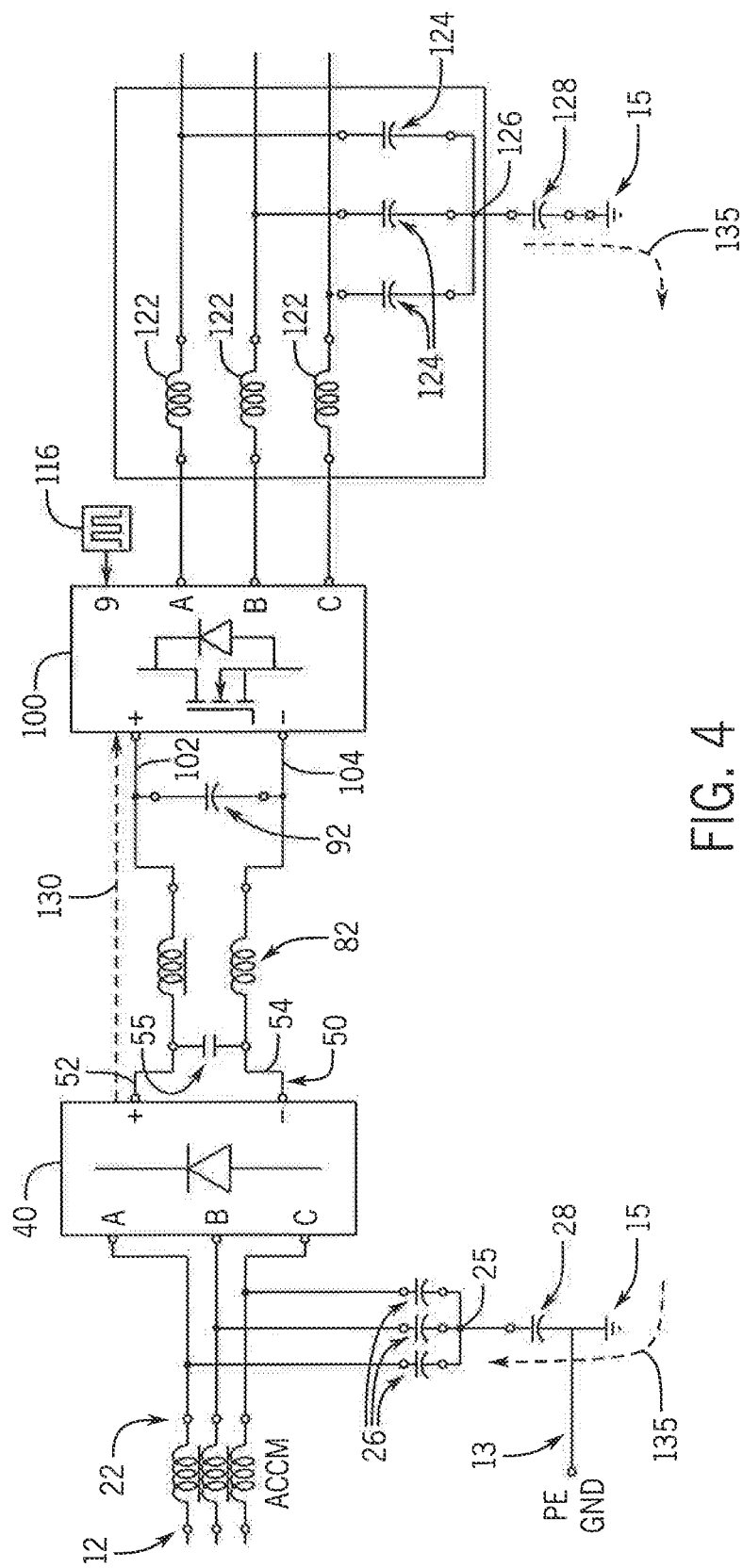
FIG. 4 is a schematic representation of the motor drive of FIG. 1 illustrating common-mode current flow through the DC bus in a first operating mode.
Figure 5:
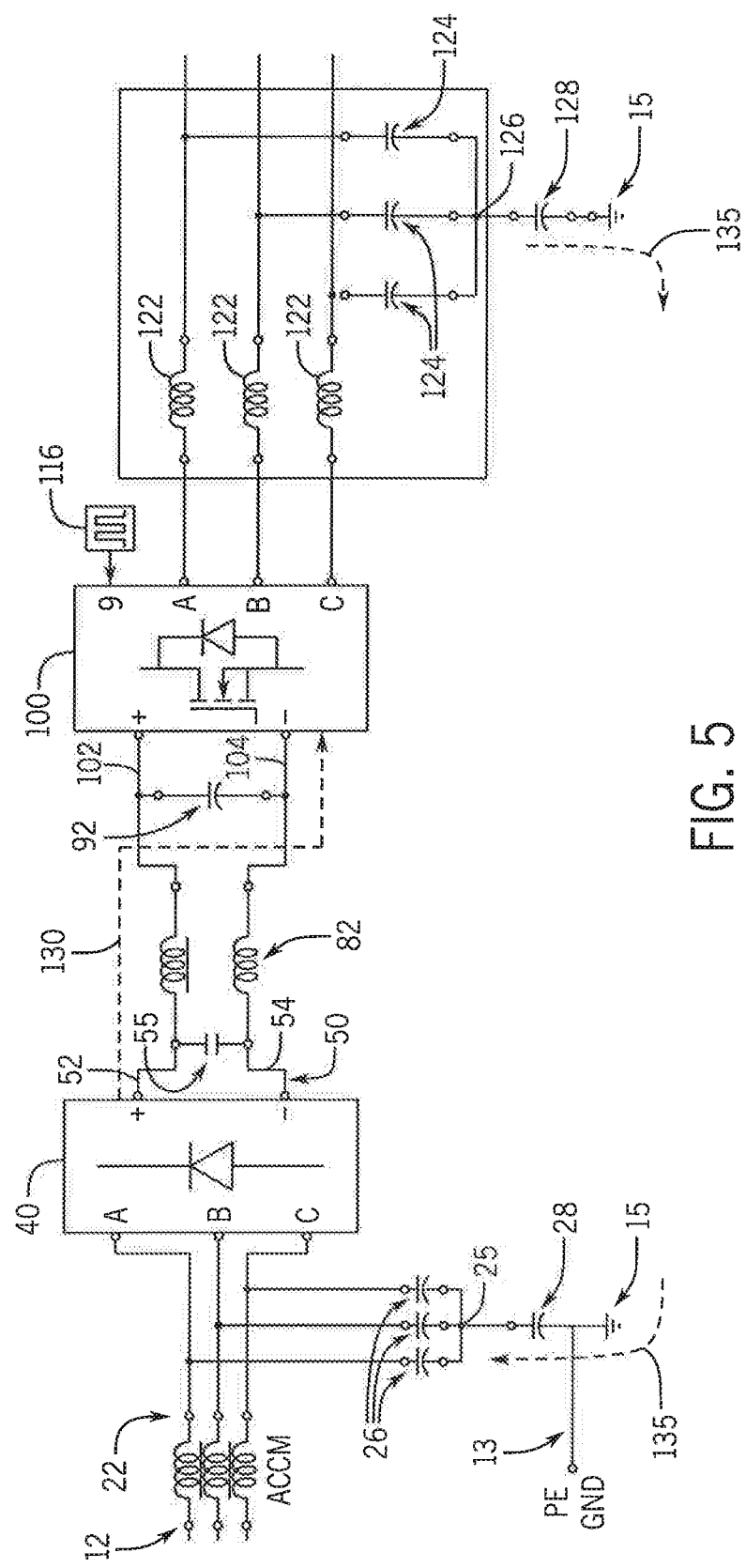
FIG. 5 is a schematic representation of the motor drive of FIG. 1 illustrating common-mode current flow through the DC bus in a second operating mode.

Turning next to FIGS. 4 and 5, the present inventors have identified an undesirable phenomenon that may occur when the motor drive 20 is operating either at a light load or at a no-load condition. When the motor 10 connected to the motor drive 20 is lightly loaded or unloaded, the modulation index will approach zero as little torque is required to cause the commanded rotation of the motor 10. For ease of illustration, a modulation index equal to zero will be considered and discussed herein. When the modulation index is zero, there are no active states required, but rather, the motor drive 20 operates solely in either the first zero state, second zero state, or a combination thereof. When the motor drive 20 is executing solely in the zero states, it is susceptible to having the amplitude of the voltage present on the DC bus 50 increase, or pump-up. If the voltage on the DC bus 50 increases too much, the motor drive 20 will need to either dissipate some of the voltage on the DC bus, for example, via a discharge resistor selectively connected across the DC bus 50 or will enter a fault condition. Dissipating the voltage across the discharge resistor results in undesirable power losses. Therefore, it would be desirable to prevent the DC bus voltage from increasing during operation in the lightly loaded condition.

Turning first to FIG. 4, the motor drive 20 is operating in the second zero state. Each of the switches 106 is connected to the positive filtered DC bus rail 102. The common-mode current 130 flowing through the DC bus 50 is illustrated leaving the converter section 40 and being conducted on to the positive rail 52 of the DC bus 50. The common-mode current 130 passes through the DC common-mode choke 82 and enters the inverter section 100 via the connection to the positive DC bus rail 102. Turning next to FIG. 5, the motor drive 20 is illustrated as having just switched from operating in the second zero state to operating in the first zero state. Each of the switches 106 is connected to the negative filtered DC bus rail 104. The common-mode current 130 flowing through the DC bus 50 is illustrated entering the inverter section 100 via the connection to the negative filtered DC bus rail 104. However, as may be seen in FIG. 5, the common-mode current 130 does not instantly change from the positive rail to the negative rail of the DC bus. The DC common-mode choke 82 is an inductor which resists rapid changes in current flow through the inductor. Thus, the common-mode current 130 continues to flow from the converter section 40 on to the positive rail 52 of the DC bus 50 and through the high frequency capacitor 92 to the filtered negative rail 104 of the DC bus. As the switching frequency increases, the common-mode impedance as a result of the filter capacitances 28, 128; as a result of the parasitic capacitance 140 in the cable 14; or as a result of a combination thereof, through which common-mode current 130 is conducted, decreases and the amplitude of the common-mode current 130 increases. During the transition between the two zero states, as illustrated in FIGS. 4 and 5, the common-mode current 130 flowing in the DC bus and through the high frequency capacitor 92 operates on the same principle as a boost converter, causing the voltage across the capacitor 92 and, as a result, the voltage on the DC bus 50 to rise. Although the common-mode current 130 is illustrated as flowing through the high frequency capacitor 92, in some embodiments, a single DC bus capacitance may be present across the DC bus and the current flows through the single DC bus capacitance.

Figure 8:
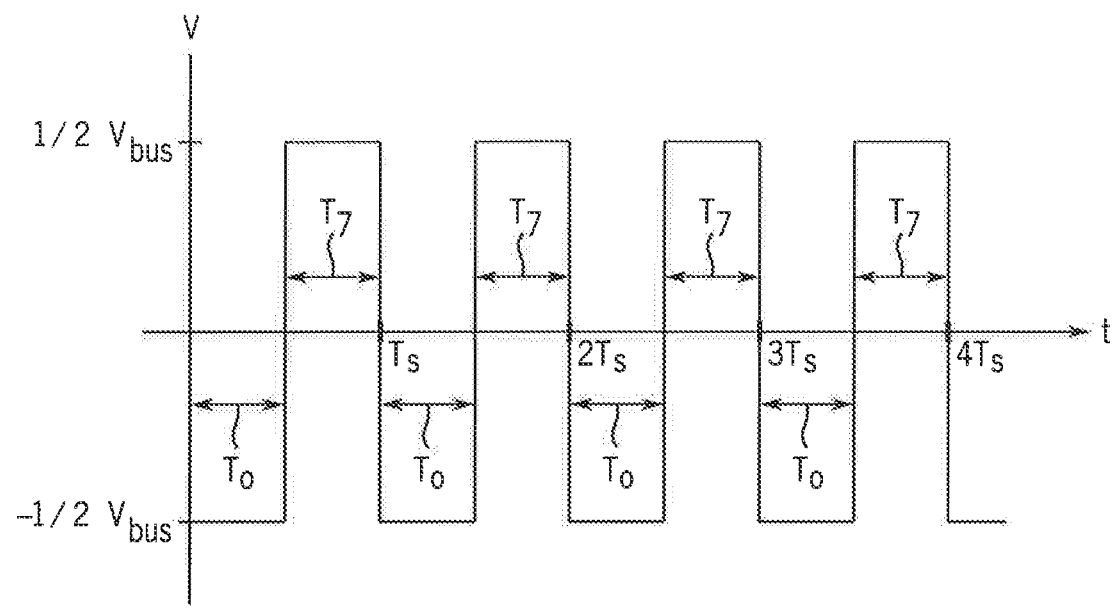
FIG. 8 is a graphical representation of an even division of two zero states within a switching period.

Turning next to FIG. 8, operation of the motor drive 20 with an even division between zero states is illustrated. FIG. 8 is assuming that there is no active state required and the entire switching period, $T_s$, is dedicated to the zero state. Over four switching periods, $T_s$, the first zero state is used for a first portion of the time, $T_0$, and the second zero state is used for a second portion of the time, $T_7$, where the switching period, $T_s$, is evenly split between the two portions. During the first portion of time, the first zero state voltage vector, $V_0$, is utilized, connecting the switches 106 in the inverter section 100 to the negative rail, and during the second portion of the time, the second zero state voltage vector, $V_7$, is used. In the illustrated embodiment, it is contemplated that the DC bus 50 is a split DC bus with the positive rail having a positive voltage potential equal to one-half of the total DC bus voltage and the negative rail having a negative voltage potential equal to a negative one-half of the total DC bus voltage.

When the motor drive is outputting the first zero state voltage vector, $V_0$, a common-mode voltage equal to negative one-half of the DC bus voltage is then present at the output of the inverter section 100. Similarly, when the motor drive is outputting the second zero state voltage vector, $V_7$, a common-mode voltage equal to positive one-half of the DC bus voltage is present at the output of the inverter section 100. If the input and output filters are present, the common-mode voltage at the output of the inverter section 100 causes a common-mode current 135 to flow through the common connection 15 of the output filter section 120 and back to the common connection 15 of the input filter 24. Alternately, if the input filter 24 is present within the motor drive 20 without an output filter 120, a parasitic capacitance 140 in the cable 14 may cause the common-mode current to flow through the parasitic capacitance 140 to the common connection 15 and back through the input filter 24. Optionally, common-mode current may flow through both an output filter 120 and a parasitic capacitance 140 to the common connection 15 and back to the input filter 24. It is contemplated that still other conduction paths between the output of the inverter section 100 and the input of the converter section 40 via the common connection 15 through which the common-mode current may circulate across the DC bus capacitance within the motor drive 20. Because the inverter is operating entirely in the zero state, the current output to the motor is low and little or no energy is dissipated in the load. The common-mode current 135, however, is recirculated through the DC bus and, in combination with the modulation, inductance, and DC bus capacitance in the system, begins to boost the level of DC voltage present on the DC bus.

Figure 9:
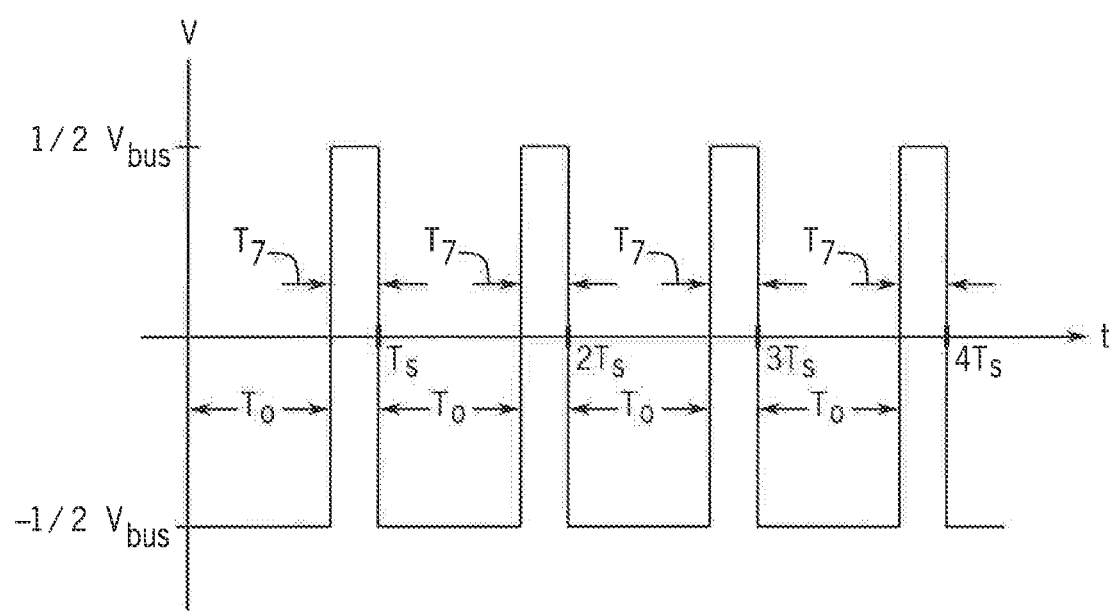
FIG. 9 is a graphical representation of an uneven division of two zero states within a switching period.

In order to prevent the DC bus pump up from occurring, the motor drive 20 may be operated with an uneven distribution of zero states as shown in FIG. 9. FIG. 9 is again assuming that there is no active state required and that the entire switching period, $T_s$, is dedicated to the zero state. However, rather than evenly dividing the switching period between to two zero states as shown in FIG. 8, the first zero state is used for about seventy-five percent of the switching period and the second zero state is used for about twenty-five percent of the switching period. The first zero state voltage vector, $V_0$, is again utilized during the first zero state and the second zero state voltage vector, $V_7$, is utilized during the second zero state. However, because the motor drive 20 is operating in the second zero state for a small portion of the switching period, $T_s$, the boost effect described above is significantly reduced.

Turning again to FIGS. 4 and 5, the DC pump-up condition occurs as a result of the switching between the two zero states. In FIG. 4, the motor drive 20 is operating in the second zero state with each of the switches 106 connected to the positive DC bus rail 102. The DC bus common-mode current 130 flows straight across one rail of the DC bus 50. At the point when the motor drive 20 switches from the second zero state (FIG. 4) to the first zero state (FIG. 5), the inductance in the DC common-mode choke 82 resists a rapid change in the common-mode current 130 to the other rail of the DC bus 50, causing the common-mode current 130 to flow through the DC bus capacitance, increasing the voltage on the DC bus. If, however, the duration of one of the states, $T_0$ or $T_7$, is minimized, the common-mode voltage produced by the inverter section 100 at the switching frequency is reduced, consequently reducing the common-mode current 130. According to one aspect of the invention, it is contemplated that the duration for the second zero state, $T_7$, may vary from fifty-five percent to ninety-five percent (55%-95%) of the switching period, $T_s$, and the duration for the first zero state, $T_0$, may vary from forty-five percent to five percent (45%-5%) of the switching period, $T_s$. Optionally, the durations for the first and second zero states may be reversed such that the motor drive 20 operates with a greater percentage of the zero state connected to the negative rail of the DC bus. Under these operating conditions, the common-mode current 130 would normally flow along the negative DC bus rail 54 during operation in the first zero state and temporarily flow through the DC bus capacitance during the second zero state. The duration for the second zero state, $T_7$, may then vary from forty-five percent to five percent (45%-5%) of the switching period, $T_s$, and the duration for the first zero state, $T_0$, may vary from fifty-five percent to ninety-five percent (55%-95%) of the switching period, $T_s$.

As indicated above, reducing the duration of time that the motor drive utilizes one of the zero states reduces the common-mode current 130 forced to flow through the DC bus capacitance and, therefore, limits the DC bus pump-up condition. With reference to FIG. 9, it is contemplated that a greater percentage of the switching period, $T_s$, is spent in the first zero state, $T_0$ and a lesser percentage of time of the switching period is spend in the second zero state, $T_7$. As an extension, utilizing only one of the two zero states (i.e., either the first zero state voltage vector, $V_0$, or the second zero state voltage vector, $V_7$) for the entire duration of the zero state within a switching period eliminates the switching between DC bus rails and eliminates the potential for DC bus pump-up to occur. However, modulation that uses only a single zero-state is not without certain drawbacks. As the modulation index and, correspondingly, the loading on the motor increases, using a single zero-state will introduce ripple current at the output of the inverter section 100. In certain modulation routines, the ripple current can increase to about fifty percent of the output current when the modulation index is at one-half. Consequently, while it may be desirable to use a single zero state or significantly limit the use of two zero states under lightly loaded or no-load conditions, it is typically desirable to utilize a more balanced combination of the two zero states as a load is applied to the motor 10.

Figure 10:
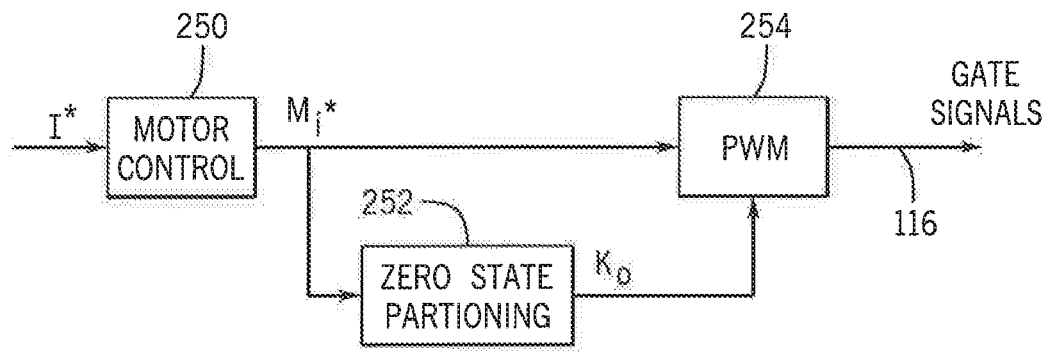
FIG. 10 is a block diagram representation of zero state partitioning.

In order to mitigate DC bus pump-up under lightly loaded or no-load conditions and to minimize current ripple on the motor as the load increases, it is contemplated that the modulation routine may utilize at least two different combinations of zero states. Turning next to FIG. 10, a block diagram representation of partitioning the two zero states is illustrated. A current reference, I*, is provided as an input to a motor control module 250 executing on the processor 112. Based on the current reference and current feedback signals, the motor control module 250 determines a desired voltage that is required to be output from the motor drive 20 to achieve desired operation of the motor 10 connected to the motor drive. As previously discussed, the desired voltage output is generated by a modulation routine 254 which selectively applies one of the voltage vectors $V_1$-$V_6$, shown in FIG. 6 to achieve the desired output voltage. A modulation index reference, $m_i^*$, is one variable that is determined by the motor control module 250 and passed to the modulation routine 254 in order for the modulation routine 254 to generate switching signals 116 and output the correct voltage. The modulation index reference, $m_i^*$, is also provided as an input to a zero state partitioning routine 252, where the zero state partitioning routine determines how the portion of the switching period, $T_s$, that is spent in a zero state is divided between the first and second zero states. The output of the zero state partitioning routine 252 is a first zero state constant, $k_0$, which defines the percentage of the zero state spent in the first zero state. The percentage of the zero state spent in the second zero state is then equal to one minus the first zero state constant.

Figure 11:
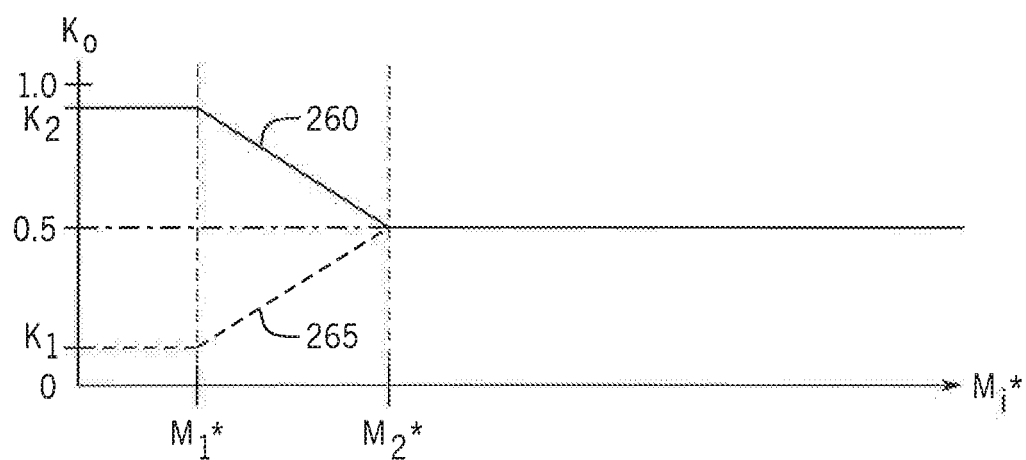
FIG. 11 is a graphical representation of zero state partitioning for varying loading of a motor.

In order to account for operation both under no load or a lightly loaded condition as well as at heavier loads, the zero state partitioning routine 252 includes at least two different operating conditions. In a first operating condition, the percentage of time spent in one of the two zero states within one switching period is partitioned unevenly between the two zero states. With reference next to FIG. 11, this first operating condition is illustrated for the modulation index reference, $m_i^*$, at values less than $m_1^*$. The time spent in one of the two zero states is set to $K_1$ and the time spent in the other of the two zero states is set to $K_2$. In a second operating condition, the percentage of time spent in one of the two zero states is partitioned evenly between the two zero states. For the modulation index reference, $m_i^*$, at values greater than $m_2^*$, $k_0$ is set equal to one-half (0.5), thereby evenly dividing the time spent in each of the two zero states.

According to one embodiment of the invention, it is contemplated that $m_1^*$ may be set equal to $m_2^*$. Under this configuration, there would be a step change between the two operating conditions. When a step change between the two operating conditions is utilized, it is further contemplated that there may be some hysteresis defined such that the transition from the first operating condition to the second operating condition may occur at a slightly different modulation index than the transition from the second operating condition to the first operating condition. The hysteresis will prevent a potentially unstable operation of the motor drive 20 if the modulation index is set at the transition point, which could result in rapid and/or repeated transitions between the two operating conditions.

According to another embodiment of the invention and as illustrated in FIG. 11, it is contemplated that $m_1^*$ may be set to a value less than $m_2^*$. A third operating condition may allow for transition between the first and second operating conditions. According to the illustrated embodiment, a linear transition occurs from the uneven partitioning occurring for the modulation index reference, $m_i^*$, at values less than $m_1^*$ to the even partitioning occurring with the modulation index reference, $m_i^*$, at values greater than $m_2^*$, Optionally, non-linear curves may be implemented while still effecting a gradual transition between the two operating conditions.

FIG. 11 also illustrates two plots identified by reference numerals 260 and 265. Each plot corresponds to one of the two methods by which the zero states may be partitioned. For the first plot 260, $k_0$ is initially set to the value of $k_2$. As defined above, $k_0$, is the first zero state constant. The motor drive 20 spends a greater percentage of time with the first zero state than the second zero state. The percentage of time spent in the second zero state corresponds to one minus the first zero state constant (which happens to correspond to the second plot 265). The second plot 265 reverses the operating states such that the motor drive 20 spends a greater percentage of time with the second zero state than the first zero state. For the second plot 265, $k_0$ is initially set to the value of $k_1$. In each of the two plots, a linear transition occurs between the operating points where the modulation index reference, $m_i^*$, is equal to $m_1^*$ and $m_2^*$. It is contemplated that the first modulation index reference, $m_1^*$, is set to a relatively low value. As this initial operating condition occurs at no load or lightly loaded conditions, the first modulation index reference may be set equal to zero and a gradual transition occurs from no load operation to the second modulation index reference $m_2^*$. Optionally, the first modulation index reference, $m_1^*$, may be set in a range from about zero to about ten percent (e.g., 0.0-0.1). The second modulation index reference, $m_2^*$, is set equal to (e.g., for a step transition) or greater than (e.g. for a gradual transition) the first modulation index reference. It is contemplated that the second modulation index reference, $m_2^*$, may be set in a range from about zero to about fifty percent (e.g. 0.0-0.5).

Figure 12:
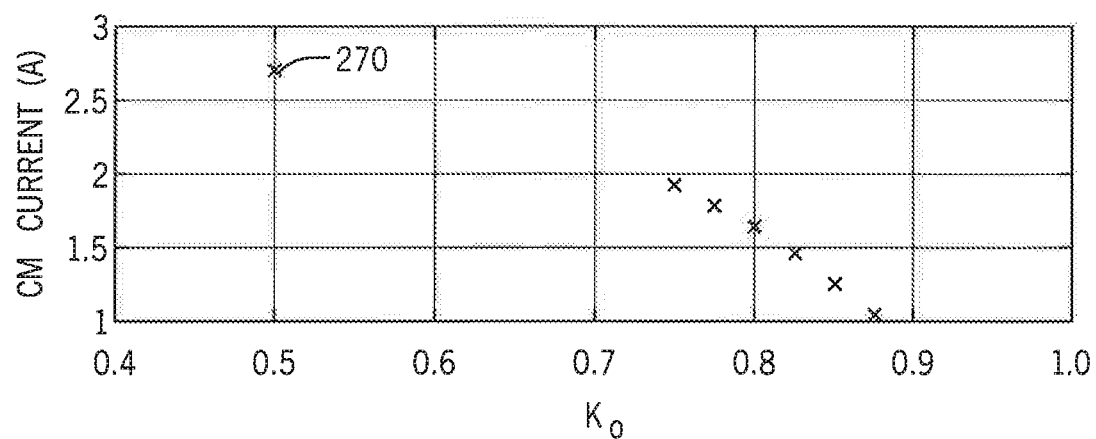
FIG. 12 is a graphical representation of experimental results showing the effectiveness of one embodiment of a zero-state partitioning algorithm in reducing common-mode current.
Figure 13:
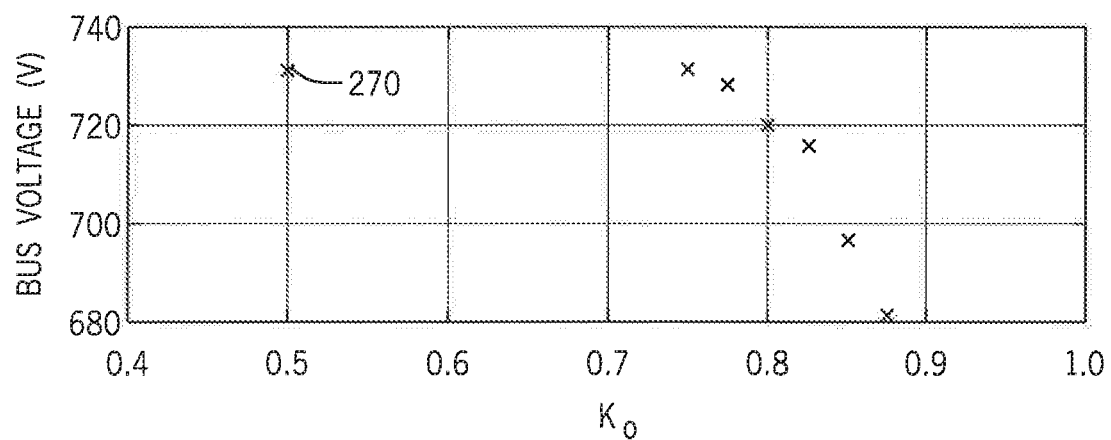
FIG. 13 is a graphical representation of experimental results corresponding to the experimental results of FIG. 12 showing the effectiveness of one embodiment of a zero-state partitioning algorithm in reducing consequent dc-bus voltage pump-up resulting from the common-mode current.

Turning next to FIGS. 12 and 13, experimental results of an inverter section 100 within the motor drive 20 operating at a sixty-four kilohertz (64 kHz) switching frequency are illustrated. Seven operating points are identified, where the first zero state constant, $k_0$, varies ate each operating point. At a first operating point 270, the first zero state constant, $k_0$, is set to one-half (0.5) which exhibits the greatest amount of DC bus voltage rise. When, for example, a four hundred eighty volt (480V) AC voltage is provided as the input voltage 12, a nominal DC bus voltage resulting from passive rectification in the converter section 40 is six hundred seventy eight volts (678 V) DC. As the first zero state constant, $k_0$, increases, the amplitude of the common mode current decreases, as seen in FIG. 12. As also seen in FIG. 13, the resulting DC bus pump up similarly decreases and the voltage present on the DC bus approaches the nominal DC bus voltage.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for generating switching commands in a motor drive, the method comprising the steps of:
   determining a modulation index for a modulation routine in the motor drive;
   determining a first percentage of time within a switching period as a function of the modulation index, wherein the first percentage of time corresponds to an active state for the modulation routine; and
   determining a second percentage of time within the switching period as a function of the modulation index, wherein:
      the second percentage of time corresponds to a zero state for the modulation routine in the motor drive,
      the zero state includes a first zero state and a second zero state,
      the modulation routine divides the zero state between the first zero state and the second zero state, and
      when the modulation index is less than one-half:
         the first zero state is used for a first portion of the zero state, the second zero state is used for a second portion of the zero state,
the first portion of the zero state is not equal to the second portion of the zero state, and
both the first portion and the second portion of the zero state are non-zero.

2. The method of claim 1 wherein, when the modulation index is greater than one-half:
the first zero state is used for the first portion of the zero state,
the second zero state is used for the second portion of the zero state, and
the first portion of the zero state is equal to the second portion of the zero state.

3. The method of claim 1 wherein the first portion of the zero state is greater than the second portion of the zero state.

4. The method of claim 3 further comprising the steps of:
setting a first value for the first portion of the zero state when the modulation index is at zero; and
varying a duration of the first portion of the zero state between the first value when the modulation index is at zero and one half of the second percentage of time when the modulation index is at one-half.

5. The method of claim 1 wherein the second portion of the zero state is greater than the first portion of the zero state.

6. The method of claim 5 further comprising the steps of:
setting a first value for the first portion of the zero state when the modulation index is at zero; and
varying a duration of the first portion of the zero state between the first value when the modulation index is at zero and one half of the second percentage of time when the modulation index is at one-half.

7. A motor drive, comprising:
a DC bus having a positive rail and a negative rail, wherein the DC bus is operative to have a DC bus voltage present between the positive and negative rails;
a DC bus capacitance connected between the positive and negative rails;
an inverter section including:
an input operatively connected to the DC bus,
an output operative to supply an output voltage to a motor connected to the motor drive, and
a plurality of switching devices operatively connected between the input and the output to selectively connect either the positive or negative rail of the DC bus to the output, wherein each of the switching devices is controlled by a switching signal; and
a processor operative to:
determine a modulation index for a modulation routine;
determine a first percentage of time within a switching period as a function of the modulation index, wherein the first percentage of time corresponds to an active state for the modulation routine; and
determine a second percentage of time within the switching period as a function of the modulation index, wherein:
the second percentage of time corresponds to a zero state for the modulation routine,
the zero state includes a first zero state and a second zero state,
the modulation routine is operative to divide the zero state between the first zero state and the second zero state, and
when the modulation index is less than an upper setpoint:
the first zero state is used for a first portion of the zero state,
the second zero state is used for a second portion of the zero state,
the first portion of the zero state is not equal to the second portion of the zero state, and
both the first portion and the second portion of the zero state are non-zero.

8. The motor drive of claim 7 wherein, when the modulation index is greater than the upper setpoint:
the first zero state is used for the first portion of the zero state,
the second zero state is used for the second portion of the zero state, and
the first portion of the zero state is equal to the second portion of the zero state.

9. The motor drive of claim 7 wherein the first portion of the zero state is greater than the second portion of the zero state.

10. The motor drive of claim 9 wherein the processor is further operative to:
set a first value for the first portion of the zero state when the modulation index is at a lower setpoint; and
vary a duration of the first portion of the zero state between the first value when the modulation index is at the lower setpoint and one half of the second percentage of time when the modulation index is at the upper setpoint.

11. The motor drive of claim 7 wherein the second portion of the zero state is greater than the first portion of the zero state.

12. The motor drive of claim 11 wherein the processor is further operative to:
set a first value for the first portion of the zero state when the modulation index is at a lower setpoint; and
vary a duration of the first portion of the zero state between the first value when the modulation index is at the lower setpoint and one half of the second percentage of time when the modulation index is at the upper setpoint.

13. The motor drive of claim 7 further comprising a long cable extending between the motor drive and the motor, wherein the long cable has sufficient parasitic capacitance to circulate currents via the parasitic capacitance to the DC bus capacitance resulting in a DC bus pump-up condition when the modulation index is less than the upper setpoint and the first portion of the zero state is equal to the second portion of the zero state.

14. The motor drive of claim 7 further comprising a DC common-mode choke operatively connected to the DC bus.

15. A method for generating switching commands in a motor drive, the method comprising the steps of:
determining a modulation index for a modulation routine in the motor drive;
determining a first percentage of time within a switching period as a function of the modulation index, wherein the first percentage of time corresponds to an active state for the modulation routine; and
determining a second percentage of time within the switching period as a function of the modulation index, wherein:
the second percentage of time corresponds to a zero state for the modulation routine in the motor drive,
the zero state includes a first zero state and a second zero state,
the modulation routine divides the zero state between the first zero state and the second zero state,
when the modulation index is less an upper setpoint:

the first zero state is used for a first portion of the zero state, the second zero state is used for a second portion of the zero state, the first portion of the zero state is not equal to the second portion of the zero state, and both the first portion and the second portion of the zero state are non-zero, and when the modulation index is greater than the upper setpoint:

the first zero state is used for the first portion of the zero state, the second zero state is used for the second portion of the zero state, and the first portion of the zero state is equal to the second portion of the zero state.

16. The method of claim 15 wherein the first portion of the zero state is greater than the second portion of the zero state.

17. The method of claim 16 further comprising the steps of:

setting a first value for the first portion of the zero state when the modulation index is at a lower setpoint; and varying a duration of the first portion of the zero state between the first value when the modulation index is at the lower setpoint and one half of the second percentage of time when the modulation index is at the upper setpoint.

18. The method of claim 15 wherein the second portion of the zero state is greater than the first portion of the zero state.

19. The method of claim 18 further comprising the steps of:

setting a first value for the first portion of the zero state when the modulation index is at a lower setpoint; and varying a duration of the first portion of the zero state between the first value when the modulation index is at the lower setpoint and one half of the second percentage of time when the modulation index is at the upper setpoint.

* * * * *